Patented Mar. 20, 1928.

1,663,350

UNITED STATES PATENT OFFICE.

KOLOMAN RÓKA, OF KONSTANZ, GERMANY, ASSIGNOR TO HOLZVERKOHLUNGS-INDUSTRIE A. G., OF KONSTANZ, GERMANY, A CORPORATION OF GERMANY.

METHOD OF PRODUCING ACETONE.

No Drawing. Application filed December 12, 1925, Serial No. 75,085, and in Germany December 10, 1924.

Commercial processes for the production of acetone in use at the present time are generally operated either through the disintegration of calcium acetate or through fermentation.

It has been proposed to convert acetic acid and acetylene to acetone by means of catalysts.

It has now been found that ethyl alcohol may be converted into acetone in a smooth reaction by treating it with water vapor, preferably by the aid of catalysts, at fairly high temperatures, as for example, temperatures from 250° to 650° C. In this process the water vapor may be used in considerable excess of the theoretical requirements.

As catalysts, may be considered such substances as are capable of causing the water to enter into reaction with ethyl alcohol, during which reaction acetone, hydrogen and carbon dioxide are formed. Among the catalysts capable of assisting in the reaction may be named oxygen compounds of metals of the 6th, 7th and 8th groups of the periodic system, as for example oxygen compounds of iron, manganese, copper and other heavy metals (that is to say, iron oxide, oxidized iron, manganic hydroxide, copper hydroxide, copper carbonate, etc.). Also, metals, as for example iron, have been found capable of producing the reaction. Other substances or mixtures containing such catalysts, as for example ferruginous minerals, may be employed advantageously.

The efficiency of the catalysts may be increased by the use of auxiliary substances furthering the reaction, as for example oxygen compounds of alkaline earth metals, including magnesium, such as calcium carbonate, calcium oxide, magnesium oxide and the like. The said auxiliary substances may of themselves produce catalytic effects, or they may be inert. When applying combinations, such as iron oxide and calcium carbonate, it has proved to be advantageous to bring the compounds into the most intimate contact with each other. For example, the separate particles of the catalytic mass may be composed of the compounds, or one compound may act as the carrier for the other. An increase in the efficiency of the reaction may be obtained by using a reaction vessel consisting of catalytic material, or containing substances having a true catalytic effect, or serving as a promoter to the catalyst used. For example, through the use of iron tubes in the reaction vessel better results have been obtained than when working with tubes of ceramic material. Particularly good results have been obtained by using the catalysts in a porous form, as for example porous, slightly oxidized iron, on which an auxiliary catalyst, as for example lime, has been precipitated.

Example.

Rusty iron chips were placed in a solution of calcium acetate, after which the mixture was evaporated with stirring. The product was finally heated to glowing. An iron tube was charged with this catalyst mass and heated to 500° C., whereupon ethyl alcohol vapor and water vapor corresponding to an ethyl alcohol solution of 10% by weight were passed through the catalyst mass and then condensed. The practical yield of acetone amounted to 80.5% of the theoretical yield (this calculation being based upon the ethyl alcohol employed).

Further research has shown that it is possible to ketonize ethyl alcohol in combination with other ketonizable substances such as acetaldehyde, acetic acid, acetic ether, and the like, and that the ketonization of acetaldehyde or of mixtures of the above mentioned compounds can be carried out successfully even in the presence of foreign substances which do not enter into the reaction, as for example methyl alcohol and the like. In conformity with this conception, mixtures containing ethyl alcohol, such as occasionally occur in the arts, may be used for producing acetone without the necessity of previously decomposing these mixtures into their constituents. Such mixtures are obtained, for example, in the preparation of acetaldehyde from ethyl alcohol, by which process compositions are obtained containing alcohol, acetaldehyde and acetic acid. The following proceeding, in which the attainment of a high theoretical output is not desired, may be found very advantageous. By this process rather large amounts of ethyl alcohol are treated in a manner to produce acetaldehyde. The reaction mixture thus formed is treated in the same apparatus for obtaining acetone, preferably after adding fresh ethyl alcohol. From the resulting mixture there may be obtained acetone, unchanged ethyl alcohol, aqueous solution of acetic acid, and some other constituents. By using a mixture containing, beside ethyl alcohol and other such substances capable of forming acetone, constituents which appear not to be ketonizable, as for example methyl alcohol or compounds capable of forming methyl alcohol, for example methyl acetate, it is possible to obtain products containing mixtures of acetone and methyl alcohol which may be utilized in the arts without the separation of their constituent parts.

At the end of certain working periods, as for example about eight days, the catalysts show a diminution of their efficiency. Experiments have shown that catalysts thus reduced as regards their efficiency may be regenerated by treatment with water vapor at increased temperatures, as for example temperatures from 450–600° C.

The regeneration process may be carried out advantageously by cutting off the supply of ethyl alcohol and by blowing water vapor through the contact mass, while maintaining the temperatures of from 500–550° C. After continuing the treatment with water vapor for about 2 to 3 hours, the regeneration process is generally complete, so that the supply of ethyl alcohol can be started again.

Another method for regenerating the catalytic mass consists in treating it with oxygen or oxygen-containing gases, such as air, at high temperatures. For example, the catalyzing process may be interrupted as soon as the efficiency of the catalytic mass is diminished, and air may be passed through the mass at temperatures from 450–600° C., preferably in such a manner that the reaction temperatures observed during the production of acetone are maintained during the course of the regeneration process.

Water vapor combined with oxygen or oxygen-containing gases such as air, may be applied advantageously for the regeneration. The process may be effected by cutting off the alcohol supply and passing through the contact mass water vapor and air heated at temperatures of from 450–600° C. When using oxygen, together with other regenerating agents, the complete regeneration of the contact mass may be recognized by the fact that oxygen is no longer absorbed or that it is no longer absorbed in considerable amounts.

Another successful method consists in activating the catalyst with water vapor or oxygen-containing gases, or both, before any exhaustion or decided weakening of the catalysts has been observed. By such a course permanently high yields of ketones are obtained.

The activity of the catalyst also may be prolonged by continuously introducing into the contact vessel small quantities of oxygen or oxygen-containing gases, together with the mixture of water vapor and ethyl alcohol, in the proportion of less than 1 mol. oxygen to 1 mol. ethyl alcohol. In this process a part of the hydrogen formed as a by-product during the reaction is burned, resulting in not only the activation of the catalyst, but also internal heating of the reaction space.

Finally, the hydrogen disengaged in the reaction also may be separated from the gases of the reaction and may be employed for the external heating of the reaction space in the carrying out of the process for preparing acetone. Obviously, both internal and external heating may be used in this process with the assistance of the hydrogen so formed.

I claim:

1. Process for the production of acetone consisting in bringing into reaction ethyl alcohol and water vapor at temperatures from about 250° C. to about 650° C. in the presence of a catalyst.

2. Process for the production of acetone consisting in bringing into reaction ethyl alcohol and water vapor in the presence of an oxygen compound of a metal of the 6th, 7th and 8th groups of the periodic system at temperatures from about 250° C. to about 650° C.

3. Process for the production of acetone consisting in bringing into reaction ethyl alcohol and water vapor at temperatures from about 250° C. to about 650° C. in the presence of an oxygen compound of a metal of the 6th, 7th and 8th groups of the periodic system, and of an auxiliary substance promoting the activity of the catalyst.

4. Process for the production of acetone characterized by the fact that ethyl alcohol and water vapor are brought into reaction in the presence of an oxygen compound of a metal of the 6th, 7th and 8th groups of the periodic system and of an oxygen compound of an alkaline-earth metal at temperatures from about 250° C. to about 650° C.

5. Process for the production of acetone characterized by bringing into reaction ethyl alcohol and water vapor in the presence of an oxygen compound of iron at temperatures from about 250° C. to about 650° C.

6. Process for the production of acetone characterized by bringing into reaction ethyl alcohol and water vapor at temperatures from about 250° C. to about 650° C. in the presence of an oxygen compound of iron and of an oxygen compound of an alkaline earth metal.

7. Process for the production of acetone characterized by the fact that vapor mixtures consisting principally of ethyl alcohol are brought into reaction with water vapor in the presence of a catalyst at temperatures from about 250° C. to about 650° C.

8. Process for the production of acetone characterized by the fact that mixtures containing ethyl alcohol and other ketonizable bodies are brought into reaction with water vapor at temperatures from about 250° C. to about 650° C. in the presence of a catalyst.

9. Process characterized by the fact that a mixture of substances containing, beside ethyl alcohol, other ketonizable bodies and bodies not participating in the reaction, is brought into reaction with water vapor at temperatures from about 250° C. to about 650° C. in the presence of a catalyst.

10. Process for the production of acetone characterized by the fact that ethyl alcohol and water vapor are caused to react at temperatures from about 250° C. to about 650° C. in the presence of a catalytically active oxygen compound of a metal of the 6th, 7th and 8th groups of the periodic system and in the presence of oxygen in the proportion of less than 1 molecule of oxygen to 1 molecule of ethyl alcohol.

In testimony whereof I have signed my name to this specification.

KOLOMAN RÓKA.